United States Patent [19]

Engelstad et al.

[11] Patent Number: 4,866,918

[45] Date of Patent: Sep. 19, 1989

[54] TORQUE LIMITING DRIVE ARRANGEMENT FOR A COTTON HARVESTER WITH MULTIPLE ROW UNITS

[75] Inventors: Jonathan L. Engelstad, Ankeny; Leon F. Sanderson, Des Moines, both of Iowa

[73] Assignee: Deere & Company, Moline, Ill.

[21] Appl. No.: 265,436

[22] Filed: Nov. 1, 1988

[51] Int. Cl.⁴ .............................................. A01D 75/18
[52] U.S. Cl. .................................... 56/10.3; 56/36; 56/40; 56/41
[58] Field of Search ............... 56/10.3, 11.4, 11.5, 56/11.7, 13.5, 36–47; 74/665 R, 392; 192/56 R, 56 C, 56 L

[56] References Cited

U.S. PATENT DOCUMENTS

| | | | |
|---|---|---|---|
| 2,355,880 | 8/1944 | Macha | 56/40 |
| 2,377,331 | 6/1945 | Dray | 56/10.3 |
| 2,815,632 | 12/1957 | Dort | 56/10.3 |
| 3,116,584 | 1/1964 | Hubbard | 56/44 |
| 3,199,644 | 8/1965 | Clapp | 192/56 R |
| 3,254,353 | 6/1966 | Johnson | 192/56 R X |
| 3,958,397 | 5/1976 | Stiff | 56/10.3 |
| 4,538,403 | 9/1985 | Fachini | 56/41 X |

Primary Examiner—Thuy M. Bui

[57] ABSTRACT

The harvesting structure on a plurality of individual row units of a cotton picker are driven by a common drive train while individual torque-limiting is provided to each row unit by a slip clutch located within the unit housing. A gearbox located at the top of each row unit housing includes a shaft projecting into the housing with the slip clutch located at the lower end of the shaft and driving an output gear meshing with the main input gear of row unit transmission.

14 Claims, 2 Drawing Sheets

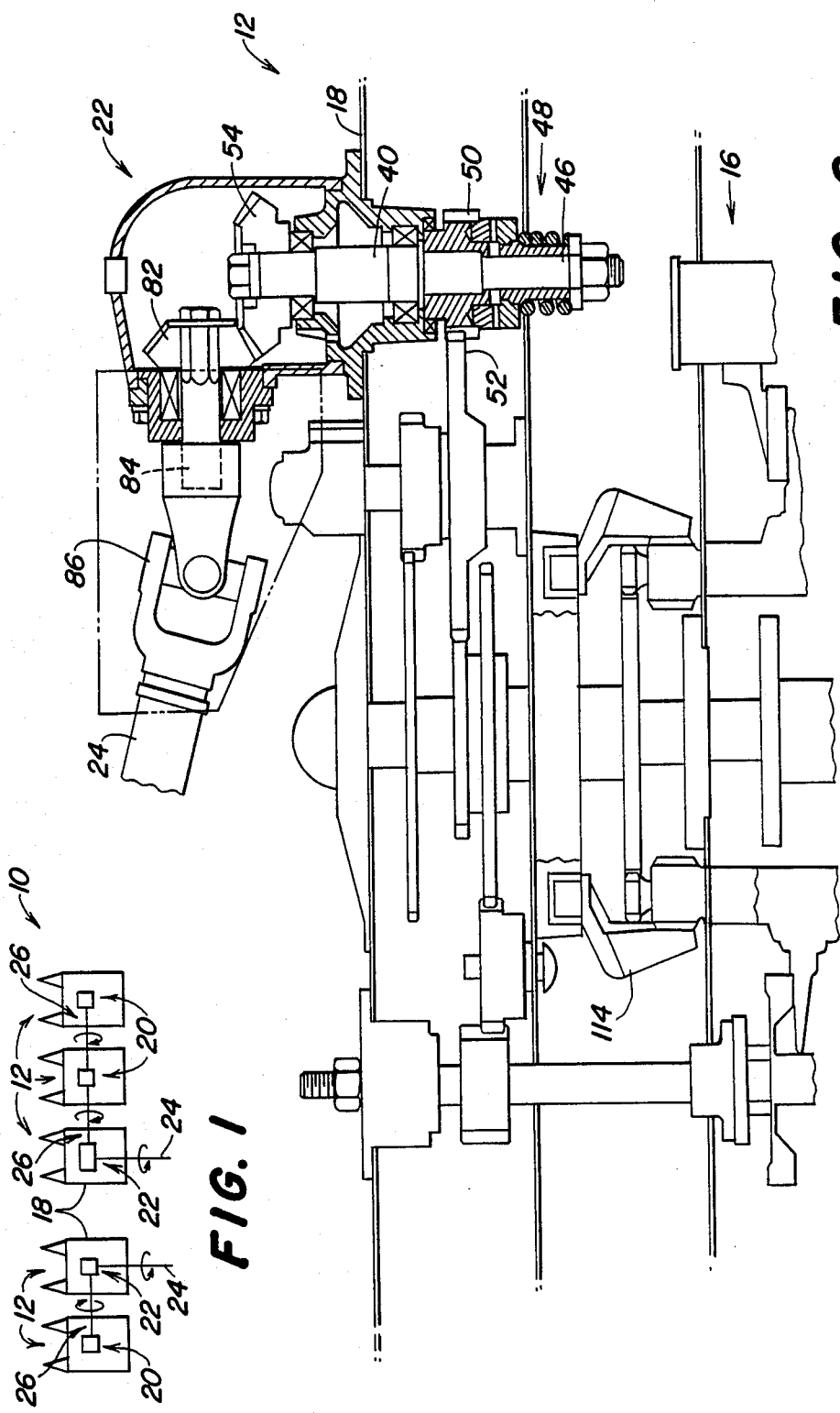

TORQUE LIMITING DRIVE ARRANGEMENT FOR A COTTON HARVESTER WITH MULTIPLE ROW UNITS

BACKGROUND OF THE INVENTION

The present invention relates generally to cotton harvesters and, more specifically, to a drive arrangement for the row units on a cotton harvester including slip clutch structure for preventing row unit component failures.

A typical cotton harvester such as the John Deere Model 9950 Cotton Picker includes a plurality of transversely spaced row units with upright housings supporting harvesting structure which is driven by a transmission within the housing. The transmission, in turn, is driven by an output gear on a vertical shaft extending downwardly into the unit from a gear case located on top of the unit. In a four-row unit, two units are driven by a fore-and-aft extending drive shaft extending from the engine area on the harvester frame. A resetting slip clutch is provided at the input of the first unit, and the second unit is driven from the first unit with overload protection being provided by the single slip clutch. With such an arrangement, the release torque setting is sufficiently high to drive the two units but low enough to give adequate protection for each individual unit. A problem, when the units are cold and the picker bars are full of grease, is that the torque is equally divided between the two units and in the cold conditions may actually exceed the desired release torque setting on the single slip clutch and cause premature slipping of the slip clutch. When this happens, the operator, rather than waiting for the row unit to warm up and the torque to lower below the release torque of the slip clutch, will tighten the slip clutch so that the units will operate immediately in the cold conditions. Once the torque setting is increased and the units are warmed up, the normal running torque of a warmed up unit is sufficiently low that if one row unit on the drive arrangement plugs with cotton or another problem exists that causes an overload in the row unit, the increased torque limit can actually cause major damage to the row unit before the slip clutch starts slipping.

A second problem which exists with the presently available torque-limited drive systems occurs in combination with new narrow row cotton pickers which harvest five or six rows of cotton simultaneously. With five- or six-row harvesting, two or three units must be driven from a single main drive shaft. With three units on a drive arrangement, the problem of cold picker unit start-up is compounded and, in addition, the release torque setting must be increased thereby reducing the protection each individual unit receives from the slip clutch. Therefore, with the increased number of row units driven from a single torque-limited drive arrangement, there is more potential for unit component failures, especially in the picker bar area of the row unit.

BRIEF SUMMARY OF THE INVENTION

It is therefore an object of the present invention to provide an improved torque-limiting drive arrangement for the row units of a cotton picker. It is a further object to provide such an arrangement which provides substantially better individual row unit protection than previously available torque-limited drive arrangements.

It is another object of the present invention to provide an improved torque-limiting drive arrangement for the row units of a cotton harvester which reduces the amount of tampering which the operator may do with the slip clutch setting to increase torque. It is a further object to provide such an arrangement wherein the torque can be accurately set at the factory and maintained over a relatively long period of time without need for the operator to reset the torque.

It is still a further object of the present invention to provide an improved torque-limiting drive arrangement for the row units of a cotton picker wherein the individual row units are protected from too much torque and are still provided with ample torque for cold unit start-up. It is another object to provide such an arrangement which includes a slip clutch located within the row unit housing rather than on the gear case housing on the row unit.

It is still another object of the present invention to provide an improved torque-limiting drive arrangement for the row units on a cotton picker wherein at least two- or three-row units are driven by a single drive shaft arrangement while still providing individual row unit protection from too much torque and allowing for cold unit start-up without the need to increase the torque setting. It is another object to provide such an arrangement which facilitates easy transverse adjustments of the row units relative to each other.

In accordance with the above objects, a torque-limiting drive arrangement includes a slip clutch that is incorporated into the output spur gear of the unit gearbox (rather than at the input where most present-day limiters are placed). The lower end of a vertical drive shaft projecting into the row unit housing and driven by the gearbox bevel gear is drivingly connected to the hub on a set of ratching slip clutch jaws. The jaws in turn mesh with another set of jaws on the output gear mounted at the lower end of the drive shaft. The output gear meshes with the main drive gear on the row unit transmission. Steel balls are utilized to interface between the hub and the lower end of the drive shaft so that the hub can move axially up and down the shaft with little resistance, thereby providing an accurate release torque. By incorporating the slip clutch into the output spur gear of the unit gearbox, each unit can be protected individually and still remain in the same drive train. Telescoping drive shaft structure extends between the gearboxes on two or three of the units to drive the units together from a single fore-and-aft extending shaft from the harvester engine. Since the slip clutch is located within the housing, it is protected from the environment and discourages the operator from tampering with the torque setting. The enclosed slip clutch in combination with the steel ball interface between the hub and the vertical drive shaft provides an accurate release torque which can be maintained over a long period of operation.

The individual gearboxes on the row units are connected by a telescoping shaft arrangement with double link chain connectors for ease of set-up and adjustment of the row units relative to each other.

These and other objects, features and advantages of the present invention will become apparent to those skilled in the art from the description which follows and from the drawings.

BRIEF DESCRIPTION OF THE DRAWINGS

FIG. 1 is a schematic representation of the drive arrangement for the harvesting units of a five-row cotton picker.

FIG. 2 is a side view, partially in section, of a portion of a row unit with the torque-limiting drive arrangement of the present invention attached thereto.

DESCRIPTION OF THE PREFERRED EMBODIMENT

Figure 3:
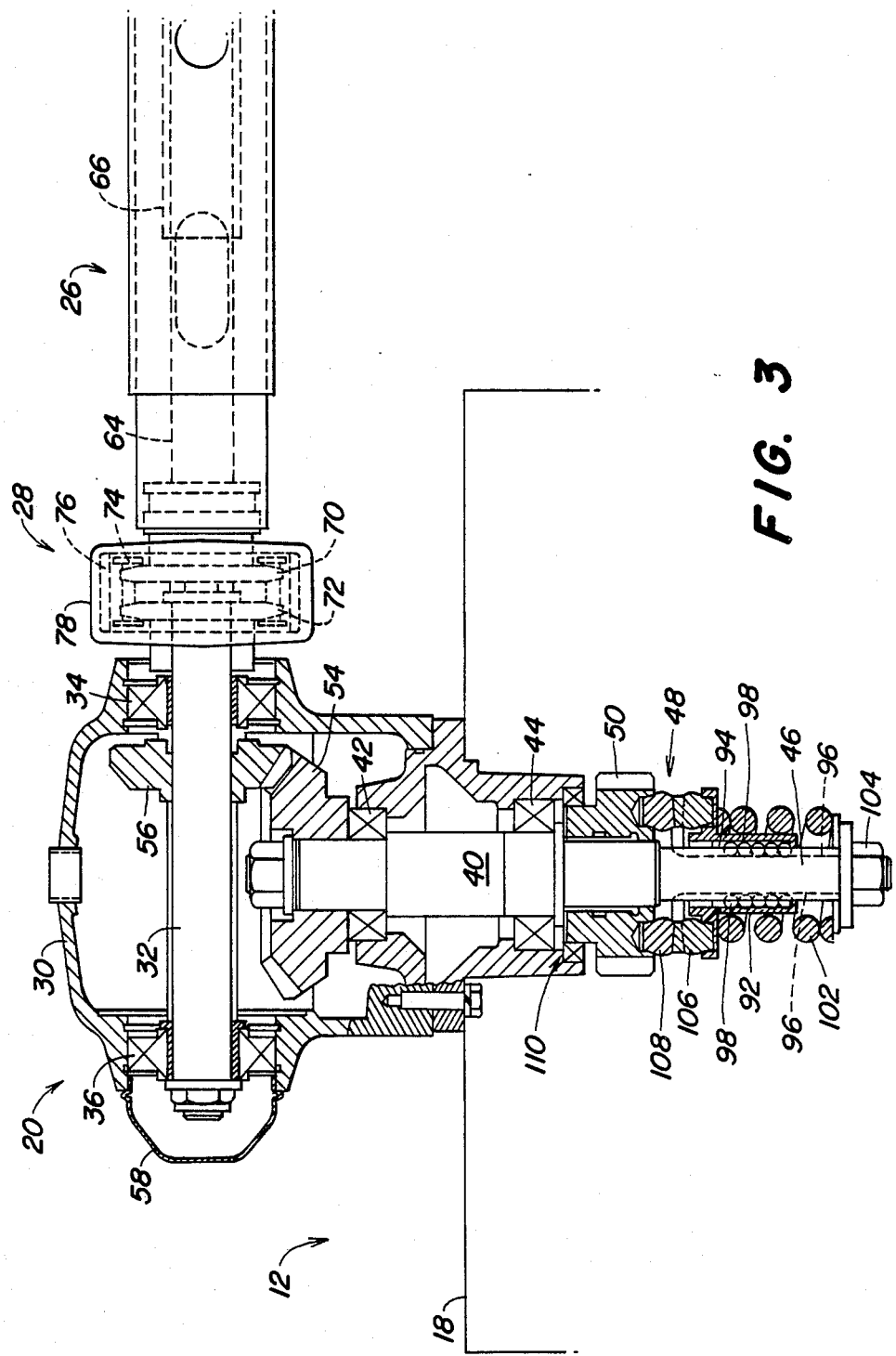
FIG. 3 is an enlarged side view of the gearbox and slip clutch arrangement and a portion of the drive shaft structure connecting the individual row unit gearboxes.

Referring to FIG. 1, there is shown a schematic representation of the forward end of a cotton picker 10 which includes a plurality of transversely spaced row units 12. The row units 12 are transversely adjustable on the forward end of the harvester 10 to accommodate different row spacings and different row capacities including five- or six-row capacity. As shown in FIG. 1, two left-hand row units 12 and three right-hand row units 12 are provided. Each row unit 12 includes conventional harvesting structure 16 (FIG. 2) supported within an upright row unit housing 18 and driven from gearbox structures 20 and 22 located on the top of the housing. The gearbox structures 22 on the innermost row units 12 are connected to fore-and-aft extending drive shafts 24 which in turn are driven from the engine on the harvester 10. Telescoping transverse shafts 26 extend between the row units 12 on each side of the harvester to connect the corresponding gearbox structures 20 and 22 for operation together from the respective drive shafts 24. The ends of the shafts 26 are connected to the corresponding gearbox structure by double link chain connectors 28 (FIG. 3).

Each gearbox structure 20 includes a gearbox housing 30 fixed to the top of the row unit housing 18. A transverse shaft 32 is journalled for rotation within the housing 30 by bearings 34 and 36. A vertical drive shaft 40 is journalled for rotation in the housing 30 by bearings 42 and 44 and includes a lower end 46 which projects into the housing 18 and supports slip clutch structure 48. The slip clutch structure 48 drives an output gear 50 which in turn meshes with a main drive gear 52 (FIG. 2) for the harvesting structure 16. A driven bevel gear 54 is fixed to the upper end of the shaft 40 and meshes with a drive bevel gear 56 (FIG. 3) fixed to the transverse shaft 32.

On the outermost gearbox structure 20, the outer end of the shaft 32 terminates within a cap 58 snapped in position at one end of the housing 30. On the center gearbox structure 20 of a central row unit 12 for a three unit drive train, the shaft 32 will project out both ends of the housing 30 and be connected to a double link chain connector 28 to the adjacent shafts 24.

The telescoping transverse shaft 26 located between the pairs of gearbox structures includes an inner tubular member 64 (FIG. 3) telescoped within an outer tubular member 66 of slightly larger diameter. The double link chain connector 28 connecting the shaft 26 with the corresponding transverse shaft 32 includes first and second sprockets 70 and 72 connected to the shafts 26 and 32, respectively and wrapped by a double link chain 74. A metal ring 76 is positioned over the double link chain 74 and is held in position over the chain by a shield 78. The connector 28 facilitates easy connection of the shafts and permits some axial misalignment of the shafts. The telescoping shaft 26 facilitates transverse adjustments of the row units 12 relative to each other.

The gearbox structure 22 on the innermost row units includes a rear bevel gear 82 (FIG. 2) which meshes with the driven bevel gear 54 to drive the corresponding vertical drive shaft 40 as well as power the drive train for the given side of the cotton harvester 10. The rear bevel gear 82 is connected to a fore-and-aft extending shaft 84 which in turn is driven by the drive shaft 24 through a universal joint 86. As the shaft 24 is rotated, drive is provided through the bevel gears 82 and 54 in the gearbox structure 22 to drive the corresponding row unit harvesting structure and the drive shaft or shafts 26 connected to the adjacent row units on the same side of the harvester.

As best seen in FIG. 3, the slip clutch structure 48 located on the gearbox for each of the row units 12 includes an axially movable hub 92 carried on the lower end of the shaft 46 and including axially extending vertical slots 94. The lower end 46 also includes corresponding vertical slots 96, and steel balls 98 are carried in the slots 94 and 96 to drive the hub 92 while permitting the hub to move axially with little resistance. A coil spring 102 is compressed between a nut and washer assembly 104 threaded onto the lower end of the shaft 40, and the upper portion of the hub 92.

The slip clutch structure 48 also includes first and second ratcheting slip clutch jaws 106 and 108, with the lower jaw 106 connected for rotation with the hub 92. The output gear 50 is rotatably mounted on the vertical drive shaft 40 and is supported against axial movement thereon by a bearing and thrust washer arrangement indicated generally at 110. The lower face of the output gear 50 receives the upper portion of the upper ratcheting slip clutch jaw 108 so that as the jaw 108 is rotated by the jaw 106, the output gear 50 will be driven to in turn drive the main input gear 52 (FIG. 2) for the harvesting structure 16. The nut 104 is adjusted to set the upper limit of torque transmitted to a level above that which is required to operate the harvesting structure when it is cold and the grease is stiff, and below that level at which the individual mechanisms such as the picker bars (indicated generally at 114) or other structure could be damaged. The torque transmitting arrangement including the balls 98 located within the vertical slots 94 and 96 maintains the upper torque limit of the slip clutch structure 48 at a relatively constant level over long periods of time so that adjustments to the torque setting are normally unnecessary. In addition, locating the slip clutch structure 48 within the housing 18 provides protection for the structure and discourages tampering with the preselected setting.

Having described the preferred embodiment, it will be apparent that modifications can be made without departing from the scope of the invention as defined in the accompanying claims.

We claim:

1. In an engine-driven cotton harvester adapted for forward movement over the ground and including a plurality of transversely spaced row units with upright housings supporting drivable harvesting structure, drive structure for driving the harvesting structure comprising:

a gearbox connected to each of the housings including a drive shaft projecting into the housing and a torque-limiting slip clutch connected to the drive shaft, the slip clutch located within the housing and providing torque-limited drive to the corresponding harvesting structure; and engine-driven shaft structure extending transversely between the row units, and means drivingly connecting the shaft structure to the gearbox for operating the individual harvesting structures through the corresponding slip clutches thereby providing simultaneous drive with individual torque protection to each of the harvesting structures.

2. The invention as set forth in claim 1 wherein each gearbox is located at the top of the corresponding housing and the drive shaft projects downwardly into the housing.

3. The invention as set forth in claim 2 wherein the drivable harvesting structure includes a main drive gear journalled in the housing for rotation about an upright axis, and the slip clutch includes an output gear meshing with the main drive gear.

4. The invention as set forth in claim 3 wherein the drive shaft includes a lower end and the slip clutch includes a hub supported on the lower end for rotation with the drive shaft and axially movable on the lower end, a spring compressed against the hub, a first set of slip clutch jaws connected to the hub, and a second set of slip clutch jaws connected to the output gear and meshing with the first set of slip clutch jaws.

5. The invention as set forth in claim 4 including a ball interface between the hub and the drive shaft for permitting the hub to move axially on the drive shaft and driving the hub from the drive shaft.

6. Gearbox structure for a cotton harvester row unit, the row unit including an upright unit housing supporting drivable cotton harvesting structure having an input gear, the gearbox structure comprising:
  a drive shaft rotatably supported by the row unit housing and including a first end, and a distal end projecting into the housing adjacent the input gear;
  drive means connected to the first end of the shaft for rotating the shaft; and
  a slip clutch connected to the distal end of the shaft and located within the housing, the slip clutch including a torque-limited output member drivingly connected to the harvesting structure input gear.

7. The invention as set forth in claim 6 wherein the slip clutch includes a torque-limit adjusting member, said adjusting member also located within the housing.

8. The invention as set forth in claim 6 wherein the slip clutch includes a hub supported for rotation on the distal end of the shaft, and first and second slip clutch jaws connected between the hub and the input gear.

9. The invention as set forth in claim 8 including a gearbox output gear rotatably supported on the drive shaft, wherein the first slip clutch jaw is connected for rotation with the drive shaft, and the second slip clutch jaw is connected for rotation with the output gear.

10. The invention as set forth in claim 8 wherein the hub is axially movable along the distal end and the distal end and hub include adjacent axially extending slots, and a plurality of balls interposed in the slots for transmitting drive from the drive shaft to the hub.

11. The invention as set forth in claim 10 including spring means compressed against the hub for urging the slip clutch jaws together.

12. The invention as set forth in claim 10 including spring adjusting means located within the row unit housing for adjusting the maximum torque transmitted through the slip clutch.

13. The invention as set forth in claim 12 wherein the spring means comprises a coil spring encircling the distal end, and the spring adjusting means comprises a nut threaded unto the distal end, said coil spring being compressed between the nut and the hub.

14. The invention as set forth in claim 13 wherein the drive shaft is vertical and the slip clutch is located below the input gear.

* * * * *